Oct. 9, 1951 C. H. NORDELL Re. 23,415

TRACTION DRIVE FOR LIQUID TREATING APPARATUS

Original Filed Aug. 23, 1941 2 Sheets-Sheet 1

INVENTOR.
Carl H. Nordell
BY Robyn Hilers
Atty.

TRACTION DRIVE FOR LIQUID TREATING APPARATUS

Original Filed Aug. 23, 1941 2 Sheets-Sheet 2

INVENTOR.
Carl H. Nordell
BY Robyn Hilers
ATTY.

Reissued Oct. 9, 1951 Re. 23,415

UNITED STATES PATENT OFFICE 23,415

TRACTION DRIVE FOR LIQUID TREATING APPARATUS

Carl H. Nordell, Palm Springs, Calif., assignor to Infilco Incorporated, a corporation of Delaware Original No. 2,418,189, dated April 1, 1947, Serial No. 408,115, August 23, 1941. Application for reissue November 28, 1947, Serial No. 788,332

17 Claims. (Cl. 210—55)

Matter enclosed in heavy brackets [ ] appears in the original patent but forms no part of this reissue specification; matter printed in italics indicates the additions made by reissue.

This invention has to do with the separation of liquids and solids and the general purpose is to provide improved apparatus for that purpose. One common form of such apparatus is that usually called a clarifier, through which liquid containing solid particles in suspension is passed in such a manner that solids will subside to the bottom and the liquid clarified to some degree may be drawn off at the top. The purpose of such clarification may be either to improve the quality of the liquid or to secure the solids in more concentrated form for use or disposal.

This invention has more particularly to do with the handling of the solids that deposit at the bottom of such apparatus and is directed to providing improved means for moving such solids to an outlet.

When the amount of liquid to be handled is small it may be passed through a small chamber having a sharply sloping bottom on which the deposited solids will slide to an outlet. Such apparatus is commonly spoken of as a settling tank. When the amount of liquid to be handled is large or the solids separate so slowly that a long retention time is necessary, then the tank or basin must be of corresponding size or volume and experience has shown that it is better to obtain the necessary size or volume by increased area rather than depth. Such basins may be round or rectangular and are frequently 100 feet in diameter, some being much larger. In such size it is not practical to use a bottom of sufficient slope because of the depth and cost involved and for other reasons. Consequently, it is the usual practice to provide a slightly sloping bottom and a scraping mechanism to move the solids to an outlet. While in rectangular basins the scraper may be of the drag type, moving in straight lines across the floor, in circular basins and in some rectangular basins the scraper revolves about a center in the basin.

Because it is simpler so to do and more readily understood, I will for purposes of exemplification describe my invention in connection with a clarifier having a basin of circular form although the principle thereof can be applied and utilized in basins of other form.

In general, such a clarifier will comprise a basin of suitable diameter and depth according to the quantity and character of the liquid to be treated. In the bottom of the basin and adjacent the floor will be a scraper mechanism and there will be provided suitable means to support this scraper and to slowly rotate it. In the floor of the bsin, usually adjacent the center, is a sludge outlet and the blades of the scraper are pitched to move the solids toward this outlet. The basin will have an inlet for the raw liquid, in a circular basin this is usually at the center, and there will be an outlet at the top which is commonly in the form of a launder having an inner weir edge and a suitable discharge. Many forms of scraper mechanism and of the support and the driving means therefor have been proposed and are in use.

This invention has to do primarily with the driving means but comprises also certain modifictions of the scraper mechanism or its support and means of attachment or cooperation between the scraper and the drive.

One object of my invention is to make the drive more positive.

Another object is to protect certain parts of the drive mechanism from interference by or because of weather conditions and so receive proper operation.

Another object is to utilize the resistance to motion of the scraper mechanism, as by the inertia or friction of the material to be moved, to increase the traction effect.

Another object is to provide a connection between the scraper and the drive such that increased resistance to the former will aid the latter in overcoming such resistances.

A principal object is to provide a form of drive or driving mechanism tht may be used in clarifiers of any size.

Another object is to improve the operation of such apparatus by an improved drive that is more positive and certain under adverse conditions of load and weather.

Other objects will be mentioned specifically hereafter or will become apparent upon consideration of the accompanying disclosure.

Clarifiers of the sort under consideration may have a centrally positioned column, which carries a major part of the weight of the scraper and other mechanism. In some cases the drive mechanism comprising a prime mover and reduction gear is mounted on this column. This form has advantages where the required torque is small but is not well adapted to cases where the deposit is heavy or otherwise hard to move or where the clarifier is of considerable size requiring correspondingly heavy gearing and other parts.

In the past many clarifiers have been built with a track around the periphery, this track being mounted on the top of the clarifier wall. On this track runs a power driven carriage which is in some way attached to and carries part of the weight of the scraper mechanism and thus as the carriage is slowly driven around the track the scraper is suitably rotated. This type of drive has many advantages but in practice certain difficulties are encountered. Thus, in winter, ice will form on the track or wheels or at any time grease may get on the track, with the result that there is insufficient friction for travel to continue. It is also common during a heavy sleet or snow storm to have such a considerable building up of snow or ice that the power available to drive the carriage is not sufficient even with traction, and the carriage stops. Protective shields or coverings over the track have not proven sufficient since these must be at least partly open and as the track must extend 360° around the basin snow and sleet will drive in somewhere, besides which such protection is relatively expensive. So common is trouble from such sources that it is common to install some sort of signal device that will operate when the carriage comes to a stop. While helpful such devices do not meet the situation because frequently clarifiers are used in a service where there is no attendant available during long periods. Also, it may not be practical to keep the track clear. During such periods of cessation solids continue to accumulate and may do so to such an extent that clarification is not obtained or that the scraper cannot be moved when the original cause of stoppage is overcome. In any case proper operation of the plant of which the clarifier is a part is seriously interfered with or ceases.

Since the major part of such trouble arises from bad weather conditions I propose to put the track in a place where it is not reached by the weather and to do this by the simple and inexpensive expedient of submerging the track in the liquid in the apparatus. The track may be near the surface or may be lower down as preference or special consideration may dictate. The important thing is that the liquid in the apparatus protect the track. If desired the bottom of the tank itself may be used as a track.

In thus submerging the track I submerge also, at least in part, the wheel or wheels that rest upon or cooperate with the track. If fully submerged no ice will adhere to the wheels. If partially submerged they may be protected by a guard or the little ice that does adhere to the wheel can be readily scraped off. It is to be understood that the wheel will rotate once or twice a minute depending on the diameter chosen, during which period little ice or snow will adhere even if exposed, whereas the travel around the track is slow, at a rate of about 5 feet a minute so that a complete circuit will take from about 15 minutes in a very small size to an hour or even more in larger sizes, during which time much more snow or ice can collect.

In the past it has been necessary to put a very considerable load on the carriage in order to receive the required tractive effect and this has at times required additional structure and undesirable forms of structure. I now propose an apparatus wherein the construction of the scraper itself and of the other associated parts may be designed without regard for such carriage loading and the necessary friction for traction obtained by other means, as will be hereafter described.

In the accompanying illustration.

Figure 1:
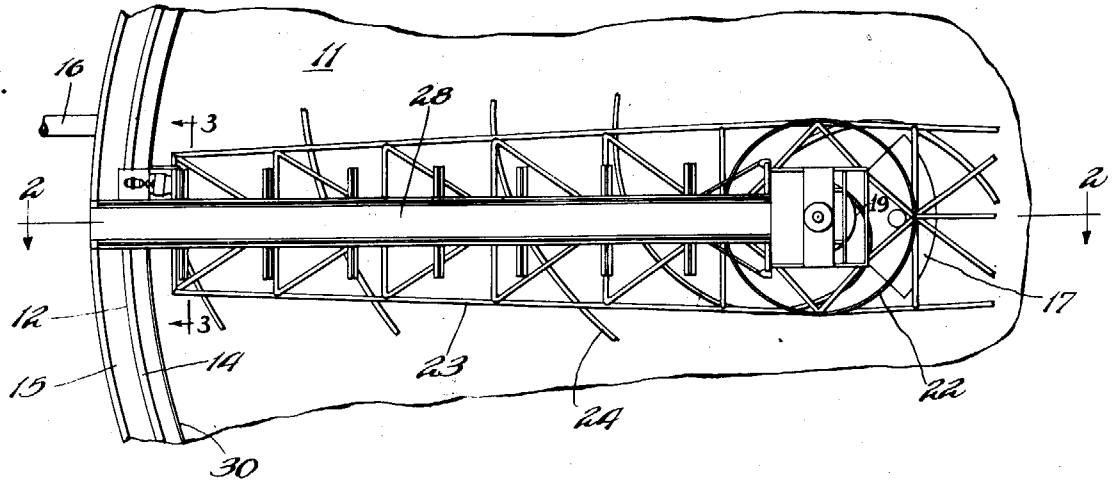
Figure 1 is a partial plan view of a clarifier embodying my invention.
Figure 2:
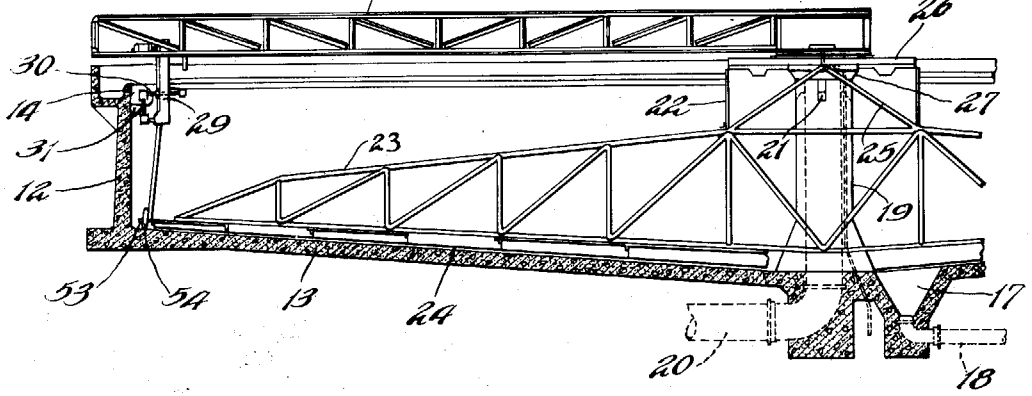
Figure 2 is a vertical sectional view along line 2—2 of Figure 1.

A clarifier, with which my invention is associated, as shown in Figures 1 and 2, comprises a basin, 11, which may be of any desired shape, such as square or rectangular, or circular as shown in the drawing. The basin, 11, is formed by a suitable vertical wall, 12, and a horizontal wall or floor, 13. At the top of the wall, 12, a weir, 14, permits the overflow of liquid into a launder, 15, which is connected to a discharge conduit, 16. Preferably, the floor, 13, will slope gradually to a sludge sump, 17, which, in the case of a circular basin, would probably be adjacent the center. A sludge withdrawal line, 18, runs from the sump, 17, to a suitable point of discharge, not shown.

It is customary in the construction of a circular clarifier to provide for the discharge of raw liquid into the center of the tank, and to provide a rotatable scraper means for pushing settled solids to the sludge sump. With a rectangular basin the influent conduit ordinarily discharges at one end of the basin while the effluent line leads from the opposite end, and any suitable means may be used to scrape settled solids to a sludge sump, which may be located at either end or in the middle. For the purpose of illustrating my invention I have shown a circular basin. At one time it was common to provide circular clarifiers with a diametrical bridge, the ends of which rested on the basin walls and from which was suspended the revolving scraper mechanism. Obviously, such construction required an exceedingly heavy and costly bridge construction as the size of the basin increased. A more recent development has been the use of a central pillar or column to support the scraper mechanism and a walkway to the mechanism located on the pillar. In Figures 1 and 2, I show a central column, 19, rising from the center of the floor, 13, to a height well above the water level fixed by the weir, 14.

Preferably, the column, 19, will contain the influent conduit, 20, which preferably discharges, as at 21, into a loading well, 22, or other suitable baffle means adapted to direct the flow of raw liquid downwardly. The loading well may be constructed of any suitable material, such as metal or wood, and may comprise an open cylinder supported either by the pillar or by the scraper truss. Obviously, such a loading well should extend well above the liquid level, 14, in the basin, 11, and should also extend to a point below the inlets, 21, so that liquid will have to flow downwardly in the center of the tank and may thereafter have a quiescent flow toward the effluent weir, 14.

A rotatable scraper truss, 23, is mounted in the basin, 11. The truss is provided with a plurality of scraper blades, 24, set to move solids inwardly during its operation to the sludge sump, 17. The scraper truss, 23, is suspended in any suitable fashion, as by truss support members, 25, mounted on a turntable, 26, and rotates on a suitable bearing or a turntable support, 27, on the top of the pillar 19. In the drawing, the loading well, 22, is shown mounted on the scraper truss, 23, and rotatable therewith.

It is often necessary for an operator to have access to the turntable and adjacent parts so that it is customary to provide a bridge or walkway, 28, running from the periphery of the tank to the center pillar. In many installations, the scraper truss, 23, and the bridge, 28, are rigidly secured to each other so that both rotate at the same time. In other installations the bridge may be fixed and the scraper truss rotate independently thereof. I prefer the former type of construction although my preferred form does not take the form customarily used. Ordinarily, the bridge and truss are rigidly secured to each other at the center so that rotation of the bridge causes rotation of the truss. Obviously, this results in considerable stress at the central connection and requires heavy construction at that point. I prefer to "pull" the truss along the basin wall from its periphery, thus avoiding the great torque stress developing in the center in the ordinary construction.

For the purpose of my invention, I prefer that the inner end of the walkway, 28, be rotatably mounted on the pillar, 19, and that the other end be supported by an integral carriage, 29, which rides upon an annular track or rail, 30, mounted on the inner side of the wall, 12, by any suitable means, such as brackets, 31. Customarily, and as shown in the drawings, the walkway, 28, and the carriage, 29, cooperate and are joined to form a unitary structure, so that it could be said that the carriage is part of the walkway, or vice versa. In Figure 2 I have shown the track, 30, as mounted away from the wall, 12, of the tank. However, it will be understood that such a track may be embedded in, as well as supported by, any wall, including the floor, or may even be such a wall itself. It will also be understood that such a track may be suitable for supporting weight or furnishing traction, or both. In this specification, and in the claims which follow, the word "track" is used in its broad sense to include any tank wall or any rail or track mounted thereon. The track should be sufficiently below the surface of the liquid to prevent coating by ice, it being understood that in such basins the water must be warm enough to avoid freezing as operation of a clarifier is impossible if ice should form along the weir, 14.

Figure 3:
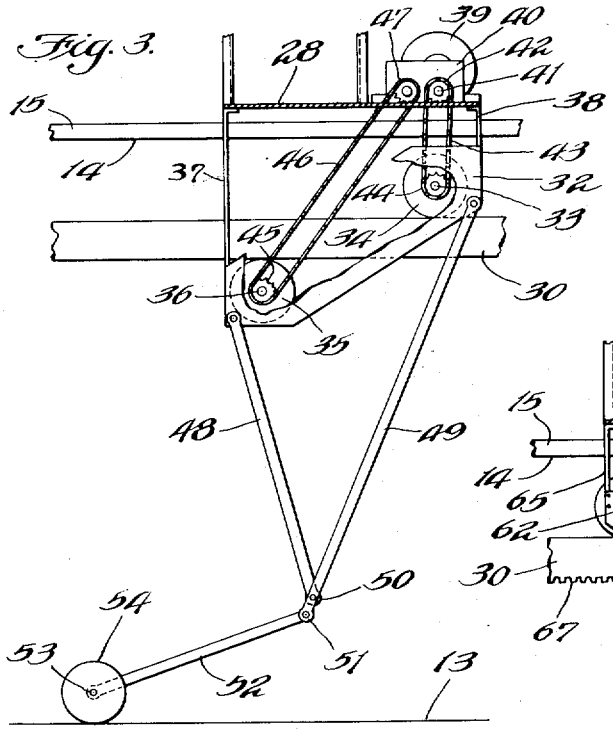
Figure 3 is a view of the drive mechanism of Figures 1 and 2 taken on line 3—3 of Figure 1.
Figure 4:
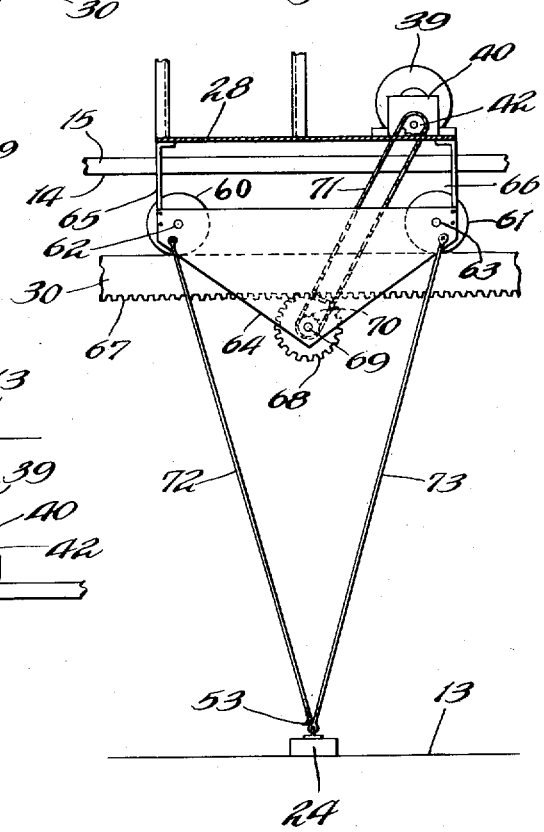
Figure 4 shows a modification of the mechanism of Figure 3.
Figure 5:
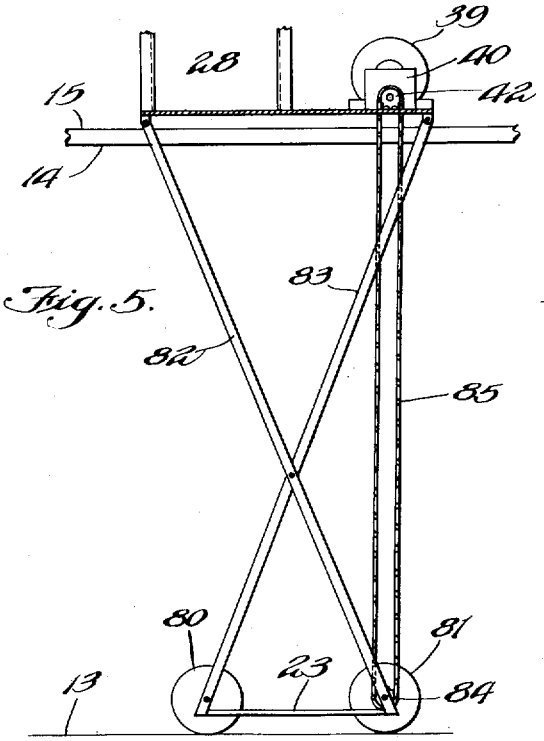
Figure 5 is an elevation of another form of drive.

The carriage, 29, may be constructed in a great variety of forms but for purposes of illustration I have shown preferred embodiments in Figures 3 and 4. In Figure 3, the carriage comprises a plate or frame, 32, in which is journaled a rotatable shaft, 33, on which is rigidly mounted a wheel, 34, riding upon the upper surface of the rail, 30. In many cases rotation of the wheel, 34, will be sufficient to rotate the walkway, 28, and the scraper mechanism which includes the truss, 23, and the blades, 24. When the friction required to effect this result can be secured I contemplate my invention in this form. In such a case as this it may be found simpler and otherwise desirable not to rest the drive wheel, 34, on the track, 30, but to omit this track and let the drive wheel rest upon, and secure traction from, the floor, 13, of the basin, as illustrated in Figure 5 and described more fully hereafter.

When the force required for rotation of the scraper mechanism is greater than can be secured by such a simple construction, I may mount a second wheel, 35, below the rail, 30, and in contact with the lower edge thereof. The lower wheel, 35, can be mounted in any suitable manner, such as on a shaft, 36.

The peripheral end of the walkway, 28, in my preferred form, is supported above the carriage, 29, in any convenient manner, such as by risers, 37 and 38. I prefer to place the driving motor, 39, upon a lateral extension of the walkway, 28, which, as above stated, is supported by the carriage, 29. The motor, 39, may be supplied with current by any suitable means and as such means are well known and in themselves are not part of this invention they are omitted for sake of simplicity. A speed reducer, 40, is connected to the motor, 39, is driven by it, and in turn drives a shaft, 41. A sprocket, 42, rigidly mounted on this shaft, 41, is connected by a chain, 43, to a sprocket, 44, which is rigidly mounted on the shaft, 33, carrying the upper wheel, 34. In this manner, when the motor, 39, is operating, the upper wheel, 34, is driven at a desired speed on the rail, 30. When two wheels are necessary, I prefer that both be driven by the motor, 39, and in such a construction I provide a sprocket, 45, mounted on the shaft, 36, to drive the lower wheel, 35, and connect it by a chain, 46, to a sprocket, 47, likewise driven by the reducer, 40 so that operation of the motor will drive both sprockets, 44 and 45, and consequently both wheels, 34 and 35.

I attach two arms, 48 and 49, from the front and back end of the carriage frame, 32, and join them adjacent their lower ends, such as at 50. The lower end of one such arm, as at 51, is connected to a trailing link, 52, which is also joined in some suitable way to a pin, 53, extending from the lower portion of the truss, 23, and upon which revolves a wheel, 54. It will be obvious that as material collects upon the floor and requires greater force to push it to the sludge sump, 17, pull on the trailing link, 52, will pull on the arm, 48 and 49, which will tend to rotate the carriage, 29, on a horizontal axis and so will cause both wheels, 34 and 35, to press more firmly against the rail, 30. This rotational effect on the carriage will increase the friction between the wheels and the rail and so provide sufficient tractive effect to cause desired rotation of the bridge, 28, and the scraper truss, 23. It is to be noted that this increase of available tractive effect will be proportional to the resistance of, i. e., the work to be done by, the scrapers, 24.

In some cases, as for instance where the load is very heavy or the liquid contains grease or greasy material, it may be desirable to provide a more direct and powerful drive than can be had by friction alone. This is contemplated and a suitable apparatus is shown in Figure 4. In this form, the general construction of the basin, truss, scrapers, center column, walkway and motor drive may be as illustrated in the other figures so that a description of those parts is not necessary. As shown in this figure, the weight of the carriage and walkway is borne by two wheels, 60 and 61, rotatably mounted upon shafts, 62 and 63, suitably journaled in a carriage frame, 64. The walkway, 28, is supported above the carriage by risers, such as 65 and 66. In this embodiment, the rail, 30, is modified to provide a rack, 67, on its lower edge. Meshing with the rack, 67, is a pinion, 68, mounted on a shaft, 69, journaled in the carriage frame, 64. The sprocket, 42, of the speed reducer, 40, is connected to a similar sprocket, 70, by a chain, 71, the latter sprocket, 70, being so mounted in respect to the pinion, 68, as to cause the pinion to revolve when the sprockets are driven by the motor, 39. The carriage frame, 64, is connected to the peripheral end of the truss, 23, by any suitable means, such as links, 72 and 73. It will be obvious that in this embodiment the operation of the motor, 39, will rotate the pinion, 68, which will furnish suitable positive force to drive the carriage along the rail, 30, even against great resistance.

A further embodiment of my invention is shown in Figure 5. In this form the general construction of the basin, scraper, truss and walkway, motor and similar elements, is the same as that shown in the other figures and need not be repeated. In this embodiment, the scraper truss, 23, is provided with a wheel or wheels which rest upon the floor, 13, of the tank, which wheels are driven by any suitable means from the motor, 39. In the drawing I show two wheels, 80 and 81, mounted at the peripheral end of the truss, 23. The circumferential end of the walkway, 28, and the truss, 23, are connected by suitable strut members, 82 and 83, thereby supporting the outer end of the walkway. One of the wheels, such as, 81, is provided with a sprocket, 84, which is connected by a chain, 85, with the sprocket, 42, of the speed reducer. In this embodiment the operation of the motor drives the wheel, 81, which causes the rotation of the truss and scraper around the basin.

As the operation of such a clarifier is thought to be obvious it will be only briefly described. The liquid enters through the conduit, 20, and escapes through the openings, 21, into the loading well, 22, which aids in distribution of the liquid. During the period of slow flow across to the periphery of the tank solids deposit and the clarified liquid escapes over the weir, 14, into the launder, 15, and so to the outlet, 16. As the carriage, 29, is moved along the track as described, it rotates the outer or circumferential end of the walkway, 28, and the truss, 23, which carries the scrapers, 24, which moves solids along the floor to the outlet, 17. I do not claim such a clarifier as a whole nor the general relation or operation of parts thereof. My invention has to do only with the driving mechanism, and with the way and place a portion of the load is carried and utilized.

It will be obvious to those skilled in the art that many modifications and variations of the invention hereinabove set forth can be made. For example, it is possible that there be no connection between the walkway, 28, and the truss, 23, at their peripheral ends, as shown in the figures. In this event the circumferential end of the walkway will be driven by the means shown and the center of the walkway and the truss so secured to each other that the rotation of the walkway will cause rotation of the truss. While such a construction is more cumbersome, due to the greater stresses arising in such a form of apparatus, it is contemplated as included within my invention. It would also be possible to utilize my invention in a rectangular clarifier, in which event the truss could be supported at each end on rails spaced from the sides of the tank, whereby the scraper means could be driven back and forth from one end of the tank to the other. This form, also, is manifestly contemplated as included within my invention. It will be obvious also that the word "traction" is used herein in its broad sense to include any cooperation between a moving wheel and a fixed surface to cause movement of the carriage or scraper, whether this is by pushing or by pulling. Accordingly, the appended claims are to be given an interpretation commensurate with the novelty herein described and as broad as may be permitted by prior art.

I claim:

1. In a liquid and solids separator comprising a tank having an inlet for liquid to be treated, an overflow weir for the escape of clarified liquid, an outlet for separated solids, and a solids scraper adapted to move separated solids over the bottom of said tank toward said solids outlet, an improved means for operating said solids scraper comprising a carriage, a fixed traction surface in said tank at a level below the level of said weir, a traction wheel carried by said carriage, engaging said traction surface and traveling along the same, a motor supported by said carriage, a power transmission mechanism joining said motor to said wheel, and a connection joining said carriage to said scraper.

2. In combination with a liquid treating apparatus comprising a tank having an inlet for liquid to be treated, an overflow weir for the escape of clarified liquid, an outlet for separated solids, and a member rotatable about a vertical axis for moving solids across the floor of the tank, a means for rotating said member comprising a carriage, a stationary track in said tank below the level of said weir, a traction wheel carried by said carriage and engaging said track, a motor supported by said carriage, a power transmission mechanism joining said motor to said wheel, and a connection joining said carriage to said rotatable member.

3. In a liquid and solids separator comprising a tank having an inlet for liquid to be treated, an overflow weir for the escape of clarified liquid, an outlet for settled solids, and a solids scraper operable to move material across the bottom of said tank, an improved means for operating said solids scraper comprising a stationary track having a traction surface within said tank and below the level of said weir, a carriage connected to said solids scraper, a traction wheel carried by said carriage and engaging said traction surface, a motor supported by said carriage, and a power transmission mechanism joining said motor to said traction wheel.

4. The apparatus of claim 3 wherein the track comprises a rack and the traction wheel is in the form of a pinion meshing with said rack.

5. The apparatus of claim 3 wherein the track is mounted on a vertical wall of said tank.

6. The apparatus of claim 3 wherein the track is an annular path on the floor of the tank.

7. In a liquid and solids separator comprising a circular tank, an inlet for liquid to be treated opening into said tank, an outlet for clarified liquid leading from the upper portion of said tank and an outlet for sedimented solids adjacent the floor of said tank, a central pillar within said tank, and a solids scraper operating over the bottom of said tank and rotatable around and at least partially supported by said central pillar and so constructed and arranged as to move solids depositing upon the floor of said tank to said solids outlet, an improved means for rotating said solids scraper and for supporting the peripheral end of such scraper comprising a stationary track within said tank and having a surface below the level of said outlet, and a traction wheel engaging said surface, a connection joining said wheel to said scraper, and means for rotating said traction wheel.

8. In a liquid and solids separator comprising a circular tank, an inlet for liquid to be treated opening into said tank, an outlet for treated liquid from the upper portion of said tank and establishing the normal liquid level in said tank, a central pillar within said tank, a solids outlet from the bottom of said tank, and a solids scraper adapted to operate over the bottom of said tank and rotatable around and at least partially supported by said central pillar, an improved means for rotating said solids scraper comprising a stationary track within said tank, said track being provided with a rack below the level of said outlet for treated liquid, a carriage, a gear mounted in said carriage and meshable with said rack, a motor supported by said carriage, a power transmission mechanism operatively joining said motor to said gear, and a connection joining said carriage with said solids scraper.

9. In a liquid and solids separator comprising a circular tank, an inlet for liquid to be treated opening into said tank, an outlet for treated liquid from the upper portion of said tank, a solids outlet adjacent the bottom of said tank, a central pillar within said tank, and a solids scraper operable over the bottom of said tank and rotatable around and at least partially supported by said central pillar, an improved means for rotating said solids scraper comprising a traction wheel mounted on said solids scraper and engaging the floor of said tank, and means for rotating said traction wheel comprising a motor supported by said scraper above the level of said outlet for treated liquid and a power transmitting mechanism operatively joining said motor to said traction wheel.

10. In a liquid and solids separator comprising a circular tank, an inlet for liquid to be treated opening into said tank, an overflow weir for escape of clarified liquid, a solids outlet from the floor of said tank, a central pillar within said tank, and a solids scraper assembly rotatable over the floor of said tank and operable to push solids depositing on the floor of said tank to said solids outlet, the inner end of said assembly being rotatably mounted upon said central pillar, an improved means for rotating, and for supporting the peripheral end of, said assembly comprising a stationary track having a surface within said tank below the level of said weir, a traction wheel mounted adjacent the peripheral end of said assembly and contacting said surface, and means for rotating said wheel comprising a motor and a power transmitting mechanism operatively joining said motor to said traction wheel.

11. In a liquid and solids separator comprising a tank having an inlet for liquid to be treated, an overflow weir for the escape of clarified liquid, an outlet for separated solids and a solids scraping mechanism for moving separated solids to said solids outlet, an improved means for operating said solids scraper comprising a track having an upper and a lower wheel engaging surface, at least one of said surfaces being below the level of said weir, a carriage, a first wheel mounted on said carriage and engaging one of said surfaces, a second wheel mounted on said carriage and engaging the other of said surfaces, at least one of said wheels being a traction wheel, the surface engaged by said traction wheel being below the level of said weir and the axes of said wheels being in horizontally separated planes, a motor mounted on said carriage, a power transmission mechanism joining said motor to said traction wheel and a rigid vertically extending member joining said carriage to said scraper.

12. In a clarifier apparatus of the type wherein a liquid and solids are separated including a tank, an outlet in said tank establishing a normal liquid level therein, and a solids scraper operable to move settled solids across the bottom of the tank to a discharge outlet, a traction mechanism for said scraper comprising a fixed track in the tank below the normal liquid level therein, a carriage frame, a wheel mounted in said frame engaging the upper surface of said track, a wheel mounted in said frame engaging the lower surface of said track, one of said wheels being a traction wheel, a motor supported by said carriage and operatively connected to said traction wheel, a lever rigidly mounted on said frame, and a link connecting said lever to said scraper mechanism, whereby on the one hand the traction wheel and surface are protected against inclement weather conditions and on the other the traction effect may be proportioned to the load on the scraper.

13. In a liquid and solids separator comprising a tank having an inlet for liquid to be treated, an overflow for the escape of clarified liquid, an outlet for separated solids, and a solids scraper assembly, the combination with said solids scraper assembly of a carriage, a wheel supporting said carriage, a wheel supporting surface supporting said wheel, a motor supported by said carriage, a stationary traction surface in said tank below the level of said overflow, a traction wheel supported by said carriage, the periphery of said traction wheel engaging said stationary traction surface, a power transmission mechanism operatively joining said motor to said traction wheel, and means for pressing said traction wheel against said surface, said means comprising a lever member joined to said carriage and pivotable about a center other than the axis of said traction wheel, and a loading means joined to said lever member in a manner to cause torque in the direction of moving said traction wheel toward said traction surface.

14. In a liquid and solids separator comprising a tank having an inlet for liquid to be treated, an overflow for the escape of clarified liquid and an outlet for separated solids, and a solids scraper mechanism for moving separated solids to said solids outlet, the combination with said solids scraper of a carriage, a wheel supporting said carriage, a wheel supporting surface supporting said wheel, a motor supported by said carriage, a fixed traction surface in said tank below the level of said overflow, a traction wheel supported by said carriage, the periphery of said traction wheel engaging said fixed traction surface, a power transmission mechanism operatively joining said motor to said traction wheel, whereby motive power is transmitted from the former to the latter, and means for increasing the tractive power of said traction wheel by pressing it against the traction surface, said means comprising a loading member and a lever joining said traction wheel to said loading member, said lever and said loading member being so constructed and arranged as to move said traction wheel toward the traction surface.

15. A liquid and solids separator comprising a circular tank, an inlet for liquid to be treated opening into said tank, an outlet for clarified liquid from the upper portion of said tank and an outlet of sedimented solids adjacent the floor of said tank, a central pillar within said tank, a solids scraper operating over the floor of said tank and rotatable around and at least partially supported by said central pillar and so constructed and arranged as to move solids deposited on the floor of said tank to said solids outlet, and means for rotating said solids scraper comprising a fixed traction surface in said tank at a level below said outlet for clarified liquid, a carriage, a traction wheel carried by said carriage, engaging said traction surface and traveling along the same, a motor supported by said carriage, a power transmission mechanism joining said motor to said wheel and a connection joining said carriage to said scraper.

*16. In apparatus for the treatment of liquid with precipitation of solids, a tank having a wall associated therewith, which wall presents a submergible and normally submerged driveway in the tank; liquid inlet and outlet means associated with the tank, whereby a liquid level can be substantially maintained in the tank, above said driveway; a frame structure adapted to be moved along said driveway; means to support said frame structure while allowing it to be moved; solids impeller means in the tank, mounted on said frame structure; a drivewheel mounted on the frame structure and adapted to contact said driveway in a direction normal to said driveway and to the periphery of said drivewheel, with sufficient pressure to provide traction; and motor means mounted on said frame structure to drive said drivewheel and thereby to drive said frame structure and solids impeller means.*

*17. Apparatus according to claim 16 wherein said tank is substantially circular, said wall is substantially peripherally located, said liquid outlet means, driveway and drivewheel are located substantially at the top of the tank, and said liquid inlet means is located remotely from said liquid outlet means, whereby said drivewheel is protected from adverse effects of the climate and of the solids precipitated in the tank.*

CARL H. NORDELL.

REFERENCES CITED

The following references are of record in the file of this patent or the original patent:

UNITED STATES PATENTS

| Number | Name | Date |
|---|---|---|
| 819,803 | Richerd | May 8, 1906 |
| 919,144 | Elmore | Apr. 20, 1909 |
| 1,057,685 | Taschl | Apr. 1, 1913 |
| 1,299,872 | Traylor | Apr. 8, 1919 |
| 1,356,608 | Dorr | Oct. 26, 1920 |
| 1,530,659 | Force | Mar. 22, 1925 |
| 1,616,218 | Force | Feb. 1, 1927 |
| 1,734,967 | Gravett | Nov. 12, 1929 |
| 1,787,274 | Johnston | Dec. 30, 1930 |
| 1,851,684 | Pruss | Mar. 29, 1932 |
| 1,951,462 | Wing | Mar. 20, 1934 |
| 1,972,584 | Easterday | Sept. 4, 1934 |
| 1,990,011 | Stokes | Feb. 5, 1935 |
| 2,051,149 | Nordell | Aug. 18, 1936 |
| 2,052,091 | Green | Aug. 25, 1936 |
| 2,064,497 | Sayers | Dec. 15, 1936 |
| 2,067,105 | Steven et al. | Jan. 5, 1937 |
| 2,068,428 | Morehead | Jan. 19, 1937 |
| 2,078,720 | Sayers | Apr. 27, 1937 |
| 2,086,829 | Streander | July 13, 1937 |
| 2,095,394 | Morehead | Oct. 12, 1937 |
| 2,110,462 | Coberly | Mar. 8, 1938 |
| 2,143,441 | Jacobs | Jan. 10, 1939 |
| 2,149,313 | Sayers et al. | Mar. 7, 1939 |
| 2,169,442 | Wuensch | Aug. 15, 1939 |
| 2,296,437 | Green | Sept. 22, 1942 |
| 2,427,091 | Durdin | Sept. 9, 1947 |

FOREIGN PATENTS

| Number | Country | Date |
|---|---|---|
| 18,569 | Great Britain | of 1903 |
| 333,974 | Great Britain | Aug. 28, 1930 |